United States Patent [19]
Schamberger

[11] 3,764,934
[45] Oct. 9, 1973

[54] LASER APPARATUS AND MIRROR ADJUSTMENT MECHANISM THEREFOR

[75] Inventor: Heinz Schamberger, Munich, Germany

[73] Assignee: Patent-Treuhand-Gesellschaft fur elektrische Gluhlampen mbH, Munich, Germany

[22] Filed: Mar. 6, 1972

[21] Appl. No.: 232,041

[30] Foreign Application Priority Data
Mar. 17, 1971 Germany............... P 21 12 755.9

[52] U.S. Cl.................. 331/94.5, 350/266, 350/285
[51] Int. Cl................................................. H01s 3/08
[58] Field of Search................. 331/94.5; 350/285, 350/266

[56] References Cited
UNITED STATES PATENTS
| | | | |
|---|---|---|---|
| 2,461,190 | 2/1949 | Wolff, Jr. | 331/94.5 |
| 3,334,959 | 8/1967 | Walsh | 331/94.5 |
| 3,359,812 | 12/1967 | Everitt | 331/94.5 |
| 3,400,596 | 9/1968 | Laich | 331/94.5 |
| 3,400,597 | 9/1968 | Nater | 331/94.5 |

*Primary Examiner*—William L. Sikes
*Attorney*—Robert D. Flynn et al.

[57] ABSTRACT

Laser with an optical resonator composed of two or more mirrors. At least one mirror is adjustable. The apparatus for fine adjustment of the mirrors comprises a suspension for the mirror which includes a pair of planar link arrangements, each having four joints, the links essentially forming a hinged, or jointed trapeze. Oppositely located links are inclined at an angle different from zero to one another. The link arrangement is manufactured, for example, from a spring plate, the joints being resiliently bendable. One parallel side of the trapeze carries the mirror. Adjusting screws adjust the alignment of pre-stressed flaps or tongues of the spring plate which form the oppositely located links. The mirror is adjustable through small angles in two mutually perpendicular planes.

11 Claims, 5 Drawing Figures

LASER APPARATUS AND MIRROR ADJUSTMENT MECHANISM THEREFOR

The present invention relates to a laser apparatus, that is, to an optical transmitter or amplifier including a medium which can be electromagnetically stimulated to radiate coherent radiation, and more particularly to an adjustment arrangement for at least one of the mirrors of the optical resonator thereof.

Lasers usually have one mirror which is movably located in order to permit adjustment of this mirror with respect to another one. To operate a laser, the angular position of the mirror must be accurately determined within a fraction of seconds of arc.

To provide for rapid and accurate adjustment of the mirror, with the desired degree of accuracy, it has been proposed to locate the mirror within a socket which is movable with respect to an opposed rigid socket in the laser apparatus. To adjust the mirror, adjustment screws are provided which tilt the mirror about a fixed tilting point. The accuracy of adjustment of such mirrors depends on the length of the leverage arm, that is, the distance of the adjustment screw from the pivot point. This distance should be as large as possible. Increasing this distance, however, is often undesirable or impossible in order to reduce the size of the laser apparatus, and with it the mirror holding device, to permit easy handling of the apparatus itself.

It has previously been proposed to locate the mirror sockets within spherical segments having a large radius of curvature, the mirror being slidable within this spherical segment. Such arrangements are difficult to adjust due to the stick-slip effect, that is, the change of the coefficient of friction from stationary to sliding friction causes an uneven, jerky motion. Likewise, when motion of the mirror is stopped, a sudden deceleration, and stop results. Such adjustment arrangements are therefore not desired in industry.

It is an object of the present invention to provide a laser which has an adjusting mechanism such that the resonating mirror can be easily adjusted with improved degree of accuracy without, however, essentially increasing the size of the laser.

Subject Matter of the Present Invention

Briefly, a laser has an optical resonator composed of two or more mirrors. At least one mirror is adjustable. The apparatus for fine adjustment of the mirrors comprises a suspension for the mirror which includes a pair of planar link arrangements, each having four joints, the links essentially forming a hinged, or jointed trapeze. Oppositely located links are inclined at an angle different from zero to one another. The link arrangement is manufactured, for example, from a spring plate, the joints being resiliently bendable. One parallel side of the trapeze carries the mirror. Adjusting screws adjust the alignment of pre-stressed flaps, or tongues of the spring plate which form the oppositely located links. The mirror is adjustable through small angles in two mutually perpendicular planes.

The four-joint connection is used only over a very small angular region. The individual connecting junctions, forming a lever element and a crank arm element can thus be formed of a single unit which, preferably, is a resilient piece of sheet steel, such as spring steel which is bent over at the edges. The bent-over edges, forming flaps, then will themselves be the junctions, or joints between the suspension elements. These bent-over flaps can be pre-stressed so that they, inherently, and additionally, provide the function of counter-springs, or yielding resistances for the adjustment screws so that additional holding springs need not be provided.

The invention will be described by way of example with reference to the accompanying drawings, wherein.

Figure 1:
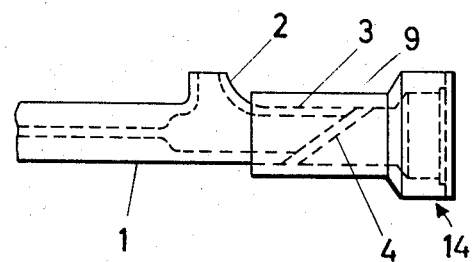
FIG. 1 illustrates, in highly schematic form, a fragmentary end view of a laser apparatus, including a mirror.
Figure 3:
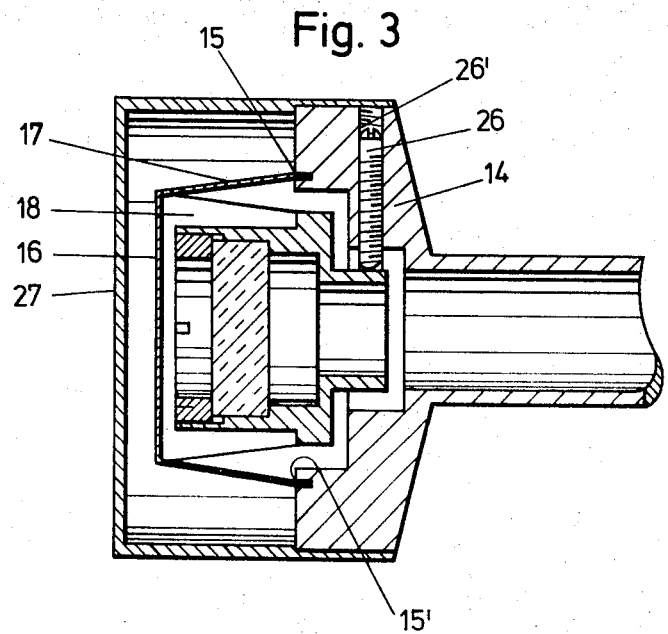
FIG. 3 is a longitudinal sectional view of a mirror holding arrangement along lines III—III of FIG. 4.
Figure 4:
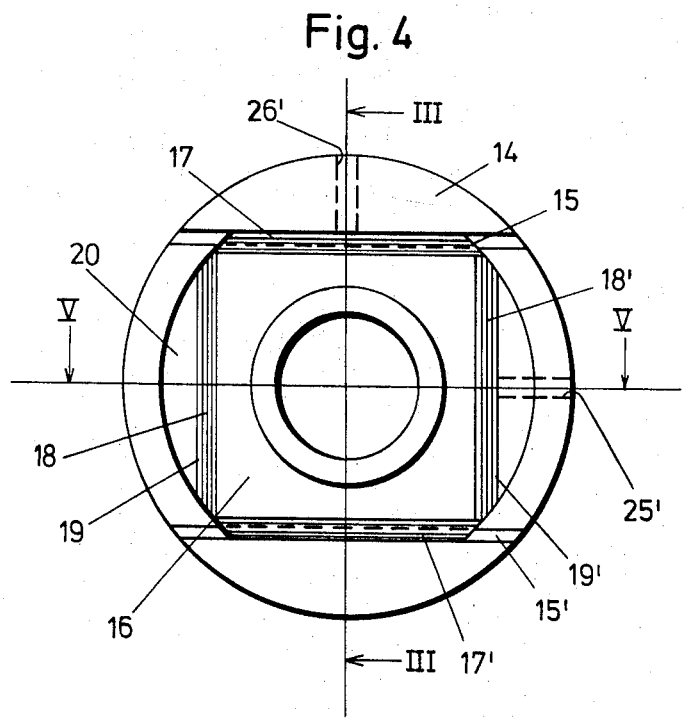
FIG. 4 is a front view of the mirror holder of FIG. 3.

Only so much of the laser apparatus as is necessary to an understanding of the present invention is shown in FIG. 1; a gas, which can be stimulated to optical emission is included within a discharge vessel 1, the laser thus being classified as a gas laser. Also other lasing materials may be used. The discharge vessel may be glass, quartz, or ceramics, and includes a lateral stub 2, through which electrodes (not shown) are placed. The end 3, extending beyond stub 2, is closed off by a window 4, inclined by the critical or Brewster angle, and fixed in position for example by being molten in place, or adhered by means of a solder glass adhesive to the discharge vessel 1. The edge of window 4, in radial direction, either smoothly closes off the end of the discharge vessel or, in some constructions, the diameter of window 4 may be slightly less than the diameter of the end of the discharge vessel. In any event, the window does not extend — in radial direction — beyond the diameter of the end of the discharge vessel, to permit placement of an attachment end 9 of a mirror holder 14 over the end 3 of the discharge vessel, and slide the end thereover and provide a fixed secure interconnection for example by adhesive, cements, or the like. The parallel arrangement of the two mirrors, with respect to each other, and necessary to obtain laser operation is obtained by adjusting the mirror within the end element, this adjustment mechanism being constructed in accordance with the invention as best illustrated in FIGS. 2—4.

Figure 2:
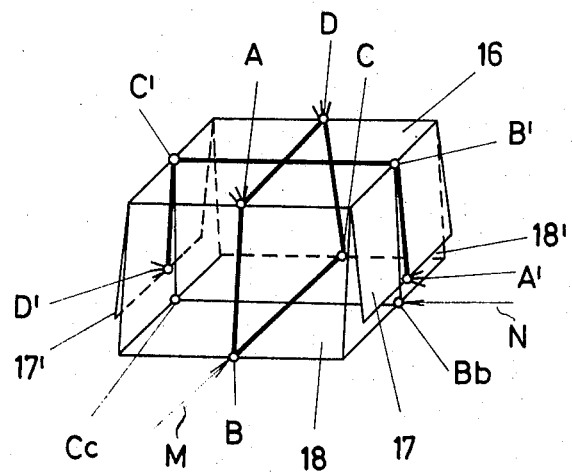
FIG. 2 is a schematic view of a double four-element suspension, illustrating the orientation of the suspension elements and, schematically, the direction of forces, and deviation, resulting in change of suspension of an element secured thereto.

FIG. 2 illustrates, in schematic form, the universal joint structure holding the mirror, and its function. The universal joint comprises an element 16 which is, generally, formed of a plate, or strip of spring steel, and so constructed that it has an essentially square base surface from which four lips or flaps, or tongues 17, 17', 18, 18' extend; the flaps are bent over at almost right angles; the bending edges between the flaps and the square plate form the joints of the suspension. Opposed flaps 18, 18' are connected with a mirror socket 20; the flaps 17, 17' at right angles to flaps 18, 18' are connected to the holder structure.

The first, planar four-joint suspension is defined by the support A–D (FIG. 2), crank arm element A–B, link distance B–C and crank arm C–D, which are to be movably interconnected. The distance A–D forming a support or base is fixed in the plane of the suspension by the structure itself, i.e., by the width of strip 16. The joint B of the crank arm element A–B can be moved by means of an adjustment screw, as schematically indicated in FIG. 2 by arrow M, which permits shifting of the entire four-junction suspension. The link distance, or link arm B–C is defined by the mirror socket 20 and, if the crank arm element A–B is moved by change of the adjustment screw, in the direction of arrow M, (that is, is rotated), a small shift will be transferred about an instantaneous and fictitious pivot point given by the intersection of crank arm element A–B and the counter crank arm C–D. Since the angle between the crank arm element A–B and the counter crank arm C–D is comparatively small, the instantaneous (fictitious) pivot point is very far from the link distance or link element B–C, which substantially improves the accuracy and fineness of adjustment due to the thus formed long lever arm.

A second four-joint suspension A′–B′–C′–D′, which is perpendicular to the four-joint suspension A–B–C–D, is formed by the holder structure A′–D′, crank arm element A′–b′, link element B′–C′ determined by the dimension of te strip 16, and which is usually essentially the same as that of dimension B–C and counter crank arm element C′–D′. The link element B′–C′ is extended to the mirror holder structure, symbolized by points Bb and Cc. An adjustment screw bears against the point Bb, to exert a force as indicated by arrow N. Due to the fixed, length of the link element B′–C′, given by the rigid plate 16 from which the flaps 17, 17′ depend, the application of force N corresponds to application of force at a point of application at B′. Thus, again, if the screw is turned in the direction of the arrow N, slight rotation of the crank arm A′–B′ will result. The link element B′–C′ rotates correspondingly with respect to the holder structure Bb, Cc, pivoting over the fictitious instantaneous pivoting point which is formed by the intersection of crank arm A′–B′ and counter crank arm C′–D′. Again, the small angle between the crank arms and the counter crank arms provides for a substantial distance between the point of application of force and the imaginary pivot point, thus providing for fineness and sensitivity of adjustment.

Figure 5:
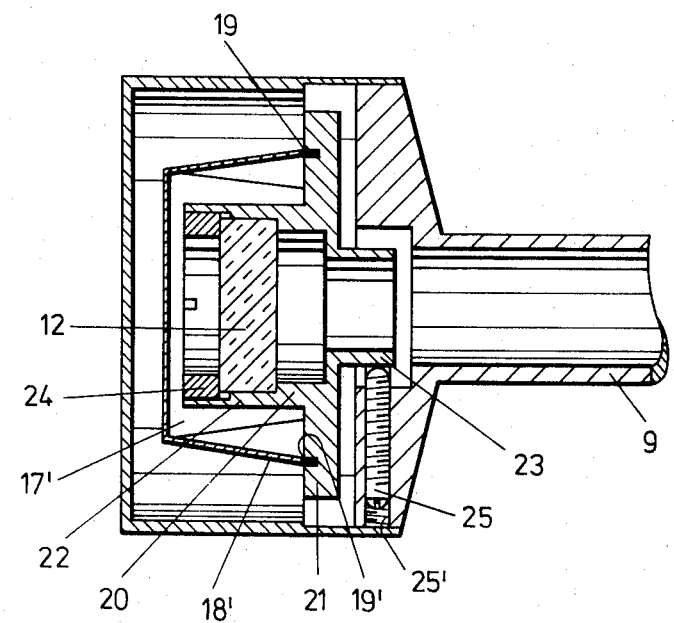
FIG. 5 is a longitudinal sectional view of a mirror holding arrangement along lines V—V of FIG. 4.

The actual construction of a four-point suspension in accordance with the invention is best seen in FIGS. 3, 4 and 5. Mirror holder 14 has a tubular extension 9 which is slid over the end 3 of the discharge vessel 1, and is secured thereto by means of cement or adhesive. Two slits 15, 15′ are formed in the mirror holder 14, to receive flaps 17, 17′ of the adjusting element and suspension 16. Element 16 is made of spring steel, and the flaps are held in slits 15, 15′ by adhesives, solder, or the like. The other two flaps 18, 18′ are secured in corresponding grooves 19, 19′ formed in a flange 21 of the mirror socket 20, and secured therein by means of adhesives or soldering. The mirror socket 20 itself has a tubular extension 22 in which the mirror 12 is secured, for example by screwing a counter ring 24 againsdt the mirror, which seats in a shoulder in the tubular extension 22. Flange 21 is extended to form a tubular projection 23 which provides bearing surfaces for adjustment screws 25, 26, threaded in tapped holes 25′, 26′, respectively which cooperate with the counter springs, formed by the inherent resiliency of the spring steel of element 16.

Element 16 provides two perpendicularly arranged four-point suspensions which are connected by a common coupling or link element which is formed by the mirror socket 20. Crank arm and counter crank arm of the four-joint suspensions, that is, the oppositely located flaps 17, 17′ and 18, 18′ incude a relatively small angle, for example in the order of about 7°. The imaginary instantaneous pivot point of the coupling link, that is, the mirror holder 20 is thus shifted in a direction towards infinity. This provides a long adjustment leverage arm with respect to the mirror. It is thus possible to shift the position of the mirror 12 by means of adjustment screws 25, 26 by minute angles. The single element 16 which, as noted, is a freely supported spring steel structure, is so arranged that the flaps are prestressed when they are inserted in the respective slits 15, 15′, 19, 19′, to provide simultaneously counter springs countering the force of application of adjustment screws 25, 26. Additional counter springs can thus be avoided. A cover 27 closes off the entire assembly to prevent contamination by dust or other outside influences.

FIG. 1 illustrates only one end of the gas laser; the other end may be similarly constructed. The only difference would be that one mirror, for example mirror 12 should be partially transmissive to the laser beam, whereas the other mirror is practically completely reflective with respect thereto. The end cover 27 is completely closed at the end having the totally reflecting mirror whereas, at the end where the laser beam is to exit, the end cover and the element 16 should have a small central opening.

Various changes and modifications may be made within the inventive concept.

I claim:

1. Laser apparatus having a medium subject to stimulated emission, and an optical resonator including at least one mirror, an adjustable means holding the mirror in adjustment position in space, said adjustable holding means comprising
 a four-joint suspension including four connecting junctions interconnected by crank arms and link arms, corresponding crank arms being co-planar and oriented with respect to each other by an angle differing from zero.

2. Apparatus according to claim 1, comprising a pair of four-joint suspensions, arranged with respect to each other offset by about 90°.

3. Apparatus according to claim 1, wherein one of the link arms interconnecting the crank arms of the four-joint suspension is formed by a mirror socket in which the mirror is retained.

4. Apparatus according to claim 2, wherein both four-joint suspensions have an element defining one of the link arms. against 5. Apparatus according to claim 1, wherein the four-joint suspension includes four arms, located in approximately trapezoidal planar arrangement, the inclined arms of the trapeze forming crank arms which include a small angle so that, upon application of force gainst a corner point of the trapeze, the imaginary pivot point of pivoting is spaced from the trapeze by a distance greater than the distance between the crank arms formed by the sides of the trapeze.

6. Apparatus according to claim 5, wherein said small angle is in the order of about 7°.

7. Apparatus according to claim 5, including an adjustment screw (25, 26) bearing against the crank arm of the trapeze, to adjust the position of the four-joint suspension and hence of the mirror.

8. Apparatus according to claim 1, wherein the joints of the four-point suspensions are formed as bent spring joints.

9. Apparatus according to claim 1, wherein the four-joint suspension is formed by an element of springy, resilient material in sheet form, having bent-over flaps, the junction between the bent-over flaps and the element forming a movable joint.

10. Apparatus according to claim 9, wherein the free ends of the flaps are pre-stressed to provide for resilient counter force upon deflection of the flaps.

11. Apparatus according to claim 5, wherein the four-joint suspension comprises an element of resilient, springy material having bent-over ends forming flaps, and the flaps forming said crank arms are located at the sides of the trapeze.

* * * * *

UNITED STATES PATENT OFFICE
CERTIFICATE OF CORRECTION

Patent No. 3,764,934　　　　　　　　　　Dated October 9, 1973

Inventor(s) HEINZ SCHAMBERGER

It is certified that error appears in the above-identified patent and that said Letters Patent are hereby corrected as shown below:

Claim 4, col. 4, line 54, please cancel "against".

Signed and sealed this 5th day of February 1974.

(SEAL)
Attest:

EDWARD M. FLETCHER, JR.　　　　　RENE D. TEGTMEYER
Attesting Officer　　　　　　　　Acting Commissioner of Patent